(12) United States Patent
Monti

(10) Patent No.: US 6,680,748 B1
(45) Date of Patent: *Jan. 20, 2004

(54) MULTI-MODE CAMERA AND METHOD THEREFOR

(75) Inventor: John Mario Monti, Los Gatos, CA (US)

(73) Assignee: Pixim, Inc.,, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/967,255

(22) Filed: Sep. 27, 2001

(51) Int. Cl.$^7$ ............................................. H04N 5/225
(52) U.S. Cl. .................... 348/220.1; 348/231.99; 348/231.2; 348/143
(58) Field of Search .............. 348/220.1, 231, 348/233, 231.2, 231.6, 231.99, 143

(56) References Cited

U.S. PATENT DOCUMENTS

| | | | | |
|---|---|---|---|---|
| 4,691,253 A | * | 9/1987 | Silver | 358/906 |
| 5,173,779 A | * | 12/1992 | Lee | 348/231 |
| 5,382,974 A | * | 1/1995 | Soeda et al. | 348/221 |
| 5,444,482 A | * | 8/1995 | Misawa et al. | 348/220 |
| 5,455,621 A | * | 10/1995 | Morimura | 348/229.1 |
| 5,461,425 A | * | 10/1995 | Fowler et al. | 348/294 |
| 5,694,167 A | * | 12/1997 | Hashimoto | 348/297 |
| 5,751,348 A | * | 5/1998 | Inuiya et al. | 348/220.1 |
| 5,903,321 A | * | 5/1999 | Tung et al. | 348/220 |
| 5,920,343 A | * | 7/1999 | Watanabe et al. | 348/222 |
| 6,151,069 A | * | 11/2000 | Dunton et al. | 348/220 |
| 6,184,930 B1 | * | 2/2001 | Mitsuhashi et al. | 348/231 |
| 6,276,605 B1 | * | 8/2001 | Olmstead et al. | 235/454 |
| 6,293,465 B1 | * | 9/2001 | Heller et al. | 235/439 |
| 6,359,649 B1 | * | 3/2002 | Suzuki | 348/220 |
| 6,519,000 B1 | * | 2/2003 | Udagawa | 348/220.1 |
| 2003/0030743 A1 | * | 2/2003 | Takahashi et al. | 348/362 |

* cited by examiner

Primary Examiner—Andrew Christensen
Assistant Examiner—Eric Wisdahl
(74) Attorney, Agent, or Firm—Joe Zheng

(57) ABSTRACT

An image acquisition system that is used to acquire digital images of objects or scenes is disclosed. The image acquisition system supports multiple modes of operation. The image acquisition system can be used to acquire and store not only video images but also still images. The image acquisition system is typically part of, or within, a digital camera, but could also itself be a digital camera.

22 Claims, 9 Drawing Sheets

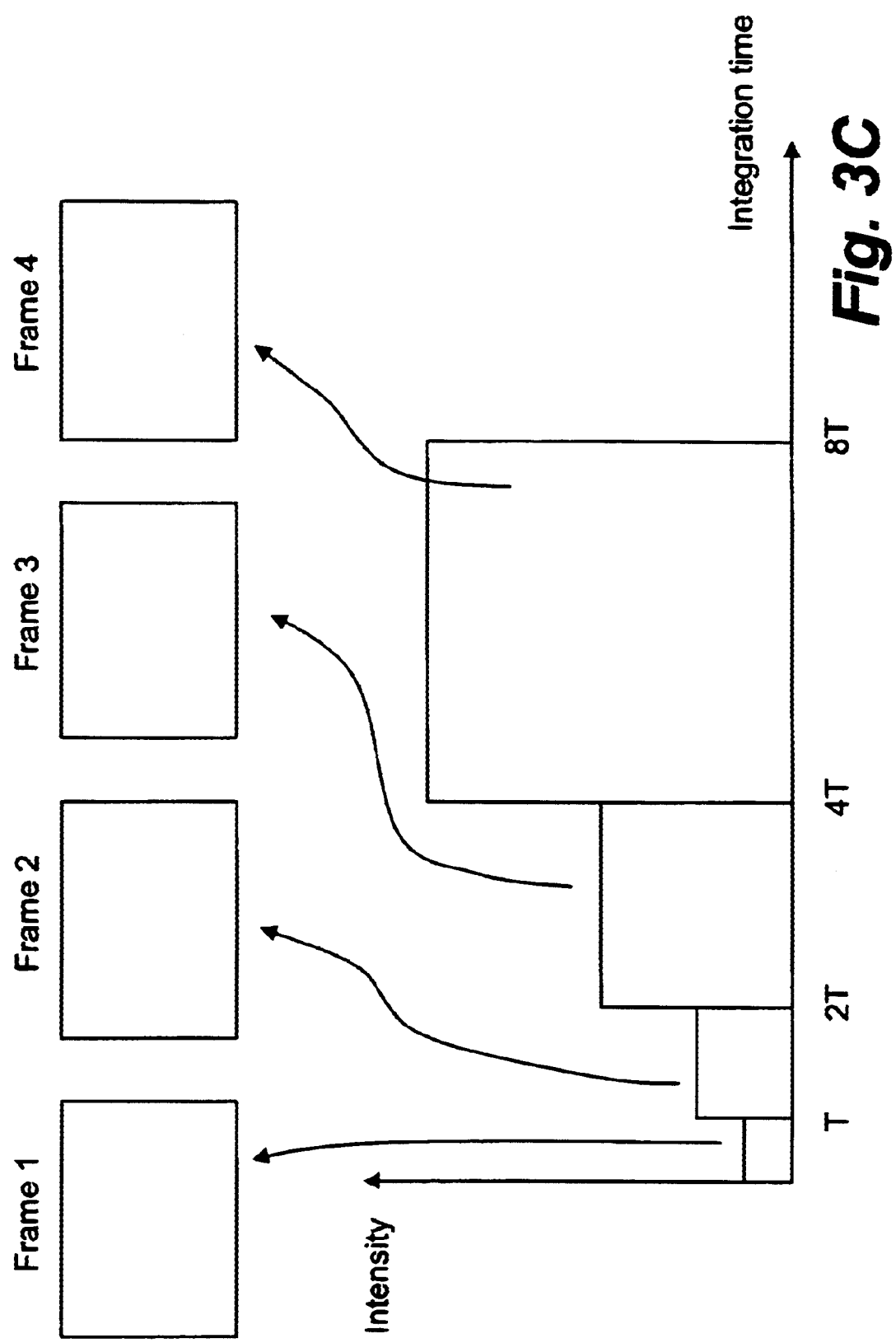

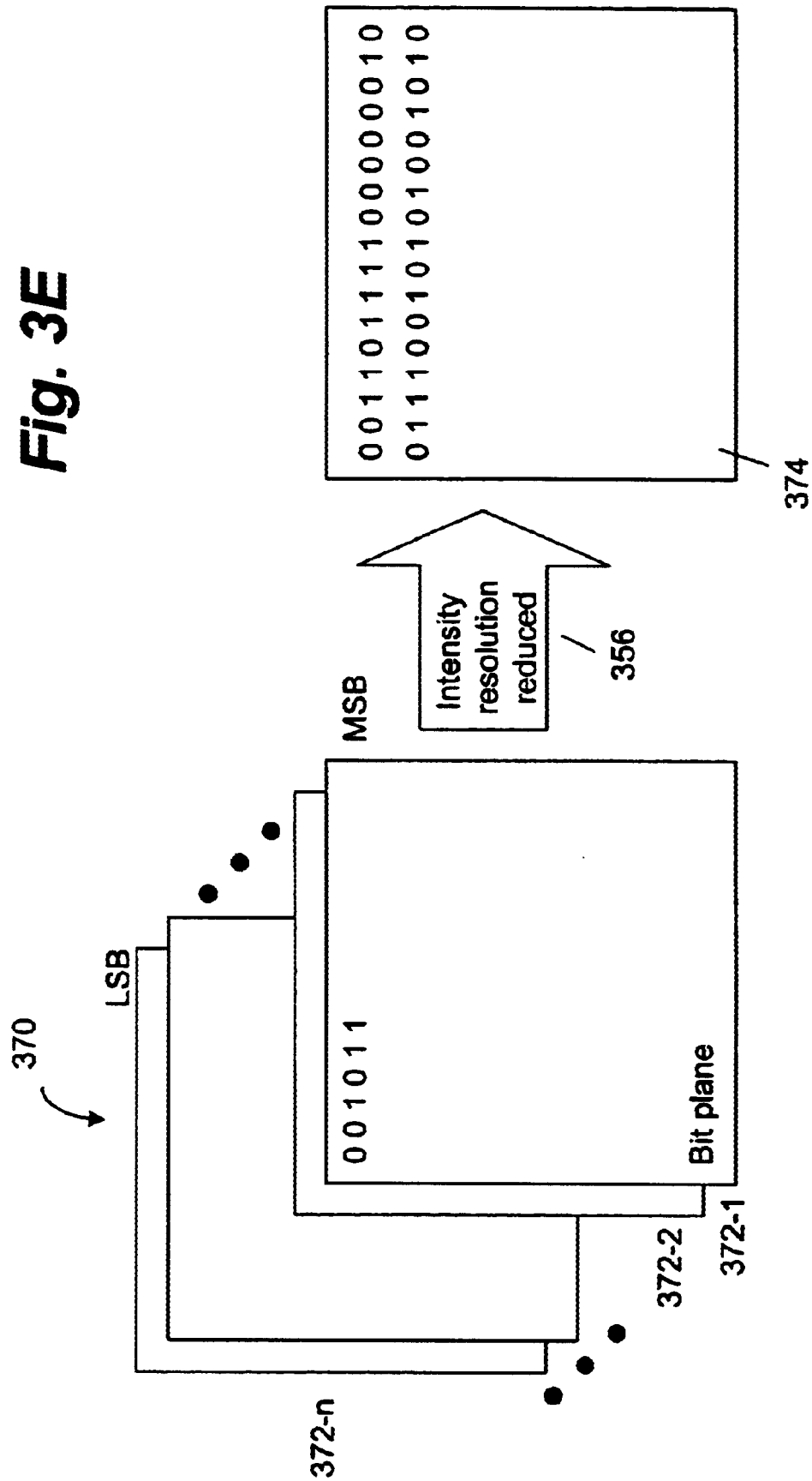

MULTI-MODE CAMERA AND METHOD THEREFOR

CROSS-REFERENCE TO RELATED APPLICATIONS

This application is related to (i) U.S. patent application Ser. No. 09/585,595, filed May 9, 2000, and entitled "Architecture of Digital Pixel Sensors Having a Sensing Area and a Digital Memory Area"; (ii) U.S. patent application Ser. No. 09/567,786, filed May 9, 2000, and entitled "Multiple Sampling via a Time-indexed Method to Achieve Wide Dynamic Ranges"; (iii) U.S. patent application Ser. No. 09/542,196, filed Apr. 4, 2000, and entitled "Method and Apparatus For Optimizing Exposure Time in Image Acquisitions"; (iv) U.S. patent application Seer. No. 09/586,681, filed Jun. 1, 2000, and entitled "Method and Apparatus For Optimizing Exposure Time in Image Acquisitions"; (v) U.S. patent application Ser. No. 09/638,503, filed Aug. 15, 2000, and entitled "Circuit and Method for Pixel Rearrangement in a Digital Pixel Sensor Readout"; (vi) U.S. patent application Ser. No. 09/798,815, filed Feb. 28, 2001, and entitled "Mobile Device Equipped with Digital Image Sensor"; and (vii) U.S. patent application Ser. No. 09/895,607, filed Jun. 29, 2001, and entitled "Single-chip Image Acquisition Device with Image Processing and Compression Engine"; each of which is hereby incorporated herein by reference.

BACKGROUND OF THE INVENTION

1. Field of the Invention

The present invention relates to cameras and, more particularly, to multi-mode cameras.

2. Description of the Related Art

Video cameras are often used for security or surveillance purposes. The use of video cameras for security purposes by consumers and businesses has grown dramatically in recent years. The stored video from these video cameras is often analyzed after a crime or accident. In other words, the stored video is analyzed as part of an investigation concerning a crime or accident or some associated lawsuit to determine the facts surrounding the incident. High resolution security cameras are rarely used since the quantity of data they produce is enormous and thus require expensive storage media and high bandwidth data networks. As a result, most video cameras use a broadcast resolution or less so that the amount of storage media needed is economically feasible. Hence, the resolution utilized is, for example, 720×480 pixels which is in accordance with the National Television System Committee (NTSC) standard. Typically, the storage media is videotape because of its low cost.

Although the stored video in this regard is useful to view incidents that have been captured on the stored video, often there is a need for capturing higher resolution and/or higher quality images so that the stored data contain more detail and useful information for investigations. Currently, security cameras are not able to offer or provide the benefits of both high resolution and/or higher quality images and manageable amounts of data storage.

Thus, there is a need for a security camera that can yield high resolution images without requiring excessive amounts of data storage.

SUMMARY OF THE INVENTION

Broadly speaking, the invention relates to an image acquisition system employing a digital pixel sensor (DPS) that supports multiple modes of operation. The image acquisition system can be used to acquire and store not only video images but also still images. The image acquisition system is typically part of or within a video camera, but could also itself be a digital camera.

According to one aspect of the invention, when the image acquisition system (e.g., digital camera) operates in a video mode, video images with low or moderate resolution and/or quality are acquired, and when the image acquisition system operates in a still mode, still images are acquired. The acquired still images through a DPS are generally of high quality and/or high resolution. The quality of an image used herein means that the image is relatively independent of ambient lighting conditions and has very high dynamic range so that details in very dark or bright areas are preserved. Generally, the images are digital images of objects or scenes.

According to another aspect of the invention, the image acquisition system (e.g., a digital camera) includes a digital pixel sensor, a memory, and an image processing unit all on a single integrated circuit (chip). Image data obtained from the image sensor and stored in the memory can be processed on-chip by the image processing unit to thus acquire and output not only video images but also still images using the same image acquisition system. In one implementation, the image acquisition system can produce high quality still images interleaved in real time with broadcast quality video images.

The invention can be implemented in numerous ways, including as a method, system and computer readable medium. Several embodiments of the invention are discussed below.

As a method for operating an electronic image capturing system having a single image sensor array, one embodiment of the invention includes at least the acts of: capturing and storing a first series of video images using the image sensor array; capturing and storing a first still image using the image sensor array; capturing and storing a second series of video images using the image sensor array; and capturing and storing a second still image using the image sensor array.

As a method for operating an electronic image capturing system having a single image sensor array, another embodiment of the invention includes at least the acts of: operating the electronic image capturing system in a first mode so that video images are captured and stored; periodically switching the electronic image capturing system to a second mode; operating the electronic image capturing system in the second mode so that a still image is captured and stored; and thereafter switching the electronic image capturing system back to the first mode.

As a single-chip image acquisition system having a video mode and a still mode, one embodiment of the invention includes at least: a digital sensor array having a plurality of pixel sensors, the digital sensor array outputs analog signals representing at least one image and having supporting circuitry for receiving and converting the analog signals to sensor digital image information; and an image processor operatively connected to the digital sensor array, the image processor operates to produce video images from the sensor digital image information when in the video mode, and operates to produce still images from the sensor digital image information when in the still mode. The digital sensor array and the image processor are provided on a single integrated circuit chip.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 3C illustrates an example of the multiple exposures according to one embodiment;

FIG. 3E shows a set of bit planes representing a part of a data memory for use in intensity resolution reduction.

DETAILED DESCRIPTION OF THE INVENTION

Figure 1:
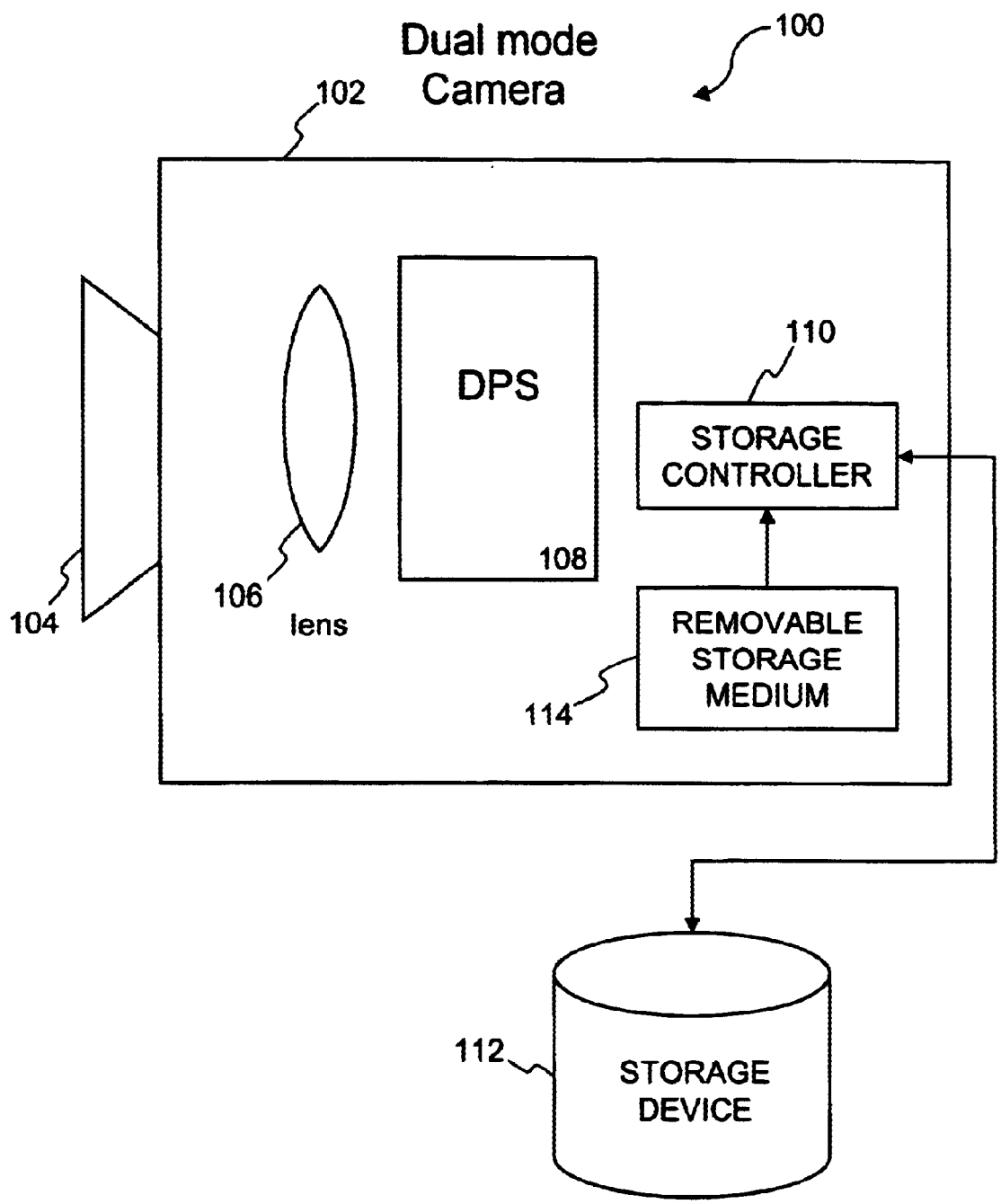
FIG. 1 is a block diagram of a camera system according to one embodiment of the invention.

The invention pertains to an image acquisition system that is used to acquire digital images of objects or scenes. The image acquisition system supports multiple modes of operation. The image acquisition system can be used to acquire and store not only video images but also still images. The image acquisition system is typically part of or within a digital camera, but could also itself be a digital camera.

According to one aspect of the invention, when the image acquisition system (e.g., digital camera) operates in a video mode, video images with low or moderate resolution and/or quality are acquired, and when the image acquisition system operates in a still mode, still images with high resolution and/or quality are acquired. The images are generally digital images of objects or scenes.

According to another aspect of the invention, the image acquisition system (e.g., digital camera) includes a digital pixel (image) sensor, a memory, and an image processing unit all on a single integrated circuit (chip). Image data obtained from the image sensor and stored in the memory can be processed on-chip by the image processing unit to thus acquire and output not only video images but also still images using the same image acquisition system. In one implementation, the image acquisition system can produce high quality still images interleaved in real time with broadcast quality video images.

Conventional cameras are not able to produce both high quality still images interleaved in real time with broadcast quality video images due to the slow read-out speed and lack of system-on-chip integration of today's predominant image sensor technologies, such as Charge Coupled Devices (CCDs) and Active Pixel Sensors (APS). A new type of imaging sensor technology, called Digital Pixel Sensor (DPS), can be uniquely employed in dual-mode camera applications, due to its fast digital data read-out (multiple gigabytes/second) and system-on-chip integration with image processing hardware (such as a RISC microprocessor or digital signal processor (DSP)) and memory on the same silicon chip allowing generation of both high quality still images in addition to broadcast quality video data in real-time. One dual-mode camera application for which the invention is particularly well suited is a security camera application.

The detailed description of the invention is presented largely in terms of procedures, steps, logic blocks, processing, and other symbolic representations that directly or indirectly resemble the operations of devices in one embodiment. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Moreover, the invention is not confined to the disclosed embodiments. The depicted embodiments serve as convenient tools to illustrate the principles of the present invention and are not intended to be limiting.

Embodiments of this aspect of the invention are discussed below with reference to FIGS. 1–3E. However, those skilled in the art will readily appreciate that the detailed description given herein with respect to these figures is for explanatory purposes as the invention extends beyond these limited embodiments.

FIG. 1 is a block diagram of a camera system 100 according to one embodiment of the invention. The camera system 100 includes a dual mode camera 102 that captures video streams in a first mode (video mode) and captures still images in a second mode (still mode). The dual mode camera 102 includes an aperture 104 through which light associated with an area or scene being monitored is received. The received light is then focused by a lens 106 onto a Digital Pixel Sensor (DPS) 108. The DPS 108 is a system-on-chip design that includes an array of photodetectors and incorporates pixel-level analog-to-digital circuitry so as to produce digital outputs right off the photodetectors. The DPS 108 also includes Random Access Memory (RAM) as well as other circuitry. The design and architecture of the DPS 108 is described in additional detail below with respect to FIGS. 2E and 3A.

The dual mode camera 102 further includes storage controller 110 that interfaces the DPS 108 with one or more storage media. In particular, the storage controller 110 can interface with a storage device 112. The storage device 112 can store audio or digital data. For example, the storage device 112 can pertain to video tape storage, CD-ROM storage, hard disk storage, writeable DVD storage, or non-volatile semiconductor memory storage (e.g., flash memory storage).

Optionally, the dual mode camera 102 can include or receive a removable storage medium 114. The removable storage medium 114 can interface with the DPS 108 via the storage controller 110. Alternatively, the removable storage medium 114 can include a memory controller and thus interface directly with the DPS 108. The removable storage medium 114 is, for example, a semiconductor memory storage product (e.g., flash memory), a magnetic storage device (e.g., small scale disk drive) or other non-volatile storage medium that is easily portable. Typically, the removable storage medium 114 plugs into a connector internal to the dual mode camera 102. Then, as desired, the removable storage medium 114 can be removed from the dual mode camera 102. It should also be noted that the storage controller 110 can be integrated into the DPS 108, the storage device 112 or the removable storage medium 114.

In general, the camera system 100 acquires and stores not only video streams but also still images. For video streams, video cameras typically store images having a broadcast resolution of about 720×480 pixels for NTSC, 720×578 for PAL, or less. While high resolution cameras could be used to obtain high resolution video streams, the amount of storage required for such image streams would overwhelm many storage devices and thus is cost prohibitive. The invention is able to continue to store broadcast quality video images while at the same time periodically storing high quality still images. The single DPS 108 provided within the dual mode camera 102 supports recording and retrieval of both the video image and the still images.

In one embodiment, the video streams obtained by the DPS 108 can be stored to the storage device 112 and the still images obtained by the DPS 108 can be stored to the removable storage medium 114. However, it should be noted that the camera system 100 only need include a single storage medium, such as either the storage device 112 or the removable storage medium 114. In the case of video streams, the storage device 112 is often a magnetic tape storage device that is able to store large amounts of data in a cost effective manner. The still images are obtained much less frequently and thus could be stored on the removable storage medium 114. In one embodiment, the video images are obtained continuously in accordance with a typical video broadcast rate, while the still images are obtained periodically. In this regard, the mode of the camera can be automatically switched between the video mode and still mode such that the DPS 108 services both modes even though they normally have different resolutions, qualities and formats.

The camera system 100 illustrated in FIG. 1 is suitable for a wide variety of applications. One application is in a security environment in which the camera watches an area or scene to record events. Typically, such security monitoring uses a broadcast quality video stream. While the video stream that has been recorded in this conventional manner is available for subsequent viewing, the quality is often rather low which can often be unsatisfactory should some detailed information be needed. By taking still images of the area or scene periodically (such as, according to a set time interval or in response to an alarm input), the still images are able to supplement the video stream. In particular, the still images provide high resolution and/or high quality images that can be viewed so that needed information is available and thus not lost due to the low resolution and/or quality of the video stream. For example, the high quality still images can be utilized to provide precise images that are useful to investigators, victims and others in reviewing events that have occurred.

Figure 2A:
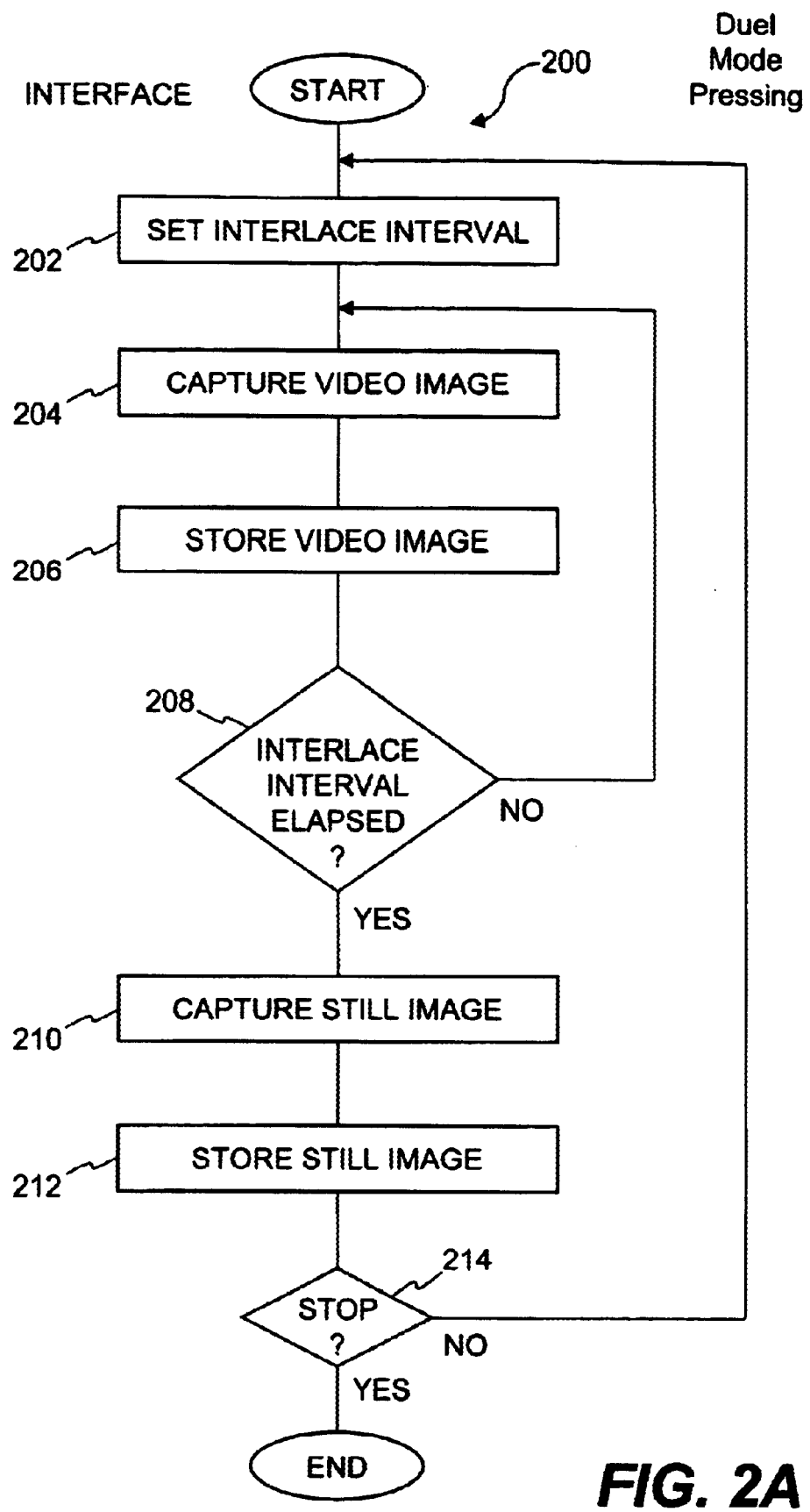
FIG. 2A is a flow diagram of dual mode processing according to one embodiment of the invention.

FIG. 2A is a flow diagram of dual mode processing 200 according to one embodiment of the invention. The dual mode processing 200 is, for example, performed by a dual mode camera, such as the dual mode camera 102 illustrated in FIG. 1.

The dual mode processing 200 initially sets 202 an interlace interval. The interlace interval sets the frequency at which still images are to be acquired and stored. The interlace interval can be fixed or programmable (e.g., user programmable). Next, a video image is captured 204. Here, the dual mode camera operates to capture 204 a video image. The video image is one frame, field, or section in a video stream. The video image is then stored 206. Here, the video image can be stored to a storage medium such as the storage device 112 or the removable storage medium 114 illustrated in FIG. 1. Typically, the video image would be stored 206 to a storage device (e.g., the storage device 112) that provides high capacity data storage. Here, a series of the video images combine to form a video stream.

After the video image has been stored 206, a decision 208 determines whether the interlace interval has elapsed. The interlace interval represents the duration of time between capture of still images. Hence, when the decision 208 determines that the interlace interval has not yet elapsed, the dual mode processing 200 returns to repeat the operations 204 and 206 until the interlace interval has elapsed. Each time the operations 204 and 206 are repeated, another video image for the video stream is captured and stored. Once the decision 208 determines that the interlace interval has elapsed, then a still image is captured 210. The still image represents an image of the same scene or area as does the video images previously obtained, but the still image has greater resolution and/or quality than do the video images. The still image is stored 212. Here, the still image can be stored in a storage medium such as the storage device 112 or the removable storage medium 114 illustrated in FIG. 1. Typically, the storage for the still image would be a storage device, such as the removable storage medium 114, that provides highly portable data storage.

Next, a decision 214 determines whether the dual mode processing 200 should stop. When the decision 214 determines that the dual mode processing should not stop, the dual mode processing 200 returns to repeat the operation 202 and subsequent operations so that video and still images can still be captured and stored. Alternatively, when the decision 214 determines that the dual mode processing 200 should stop, the dual mode processing 200 is complete and ends.

Figure 2B:
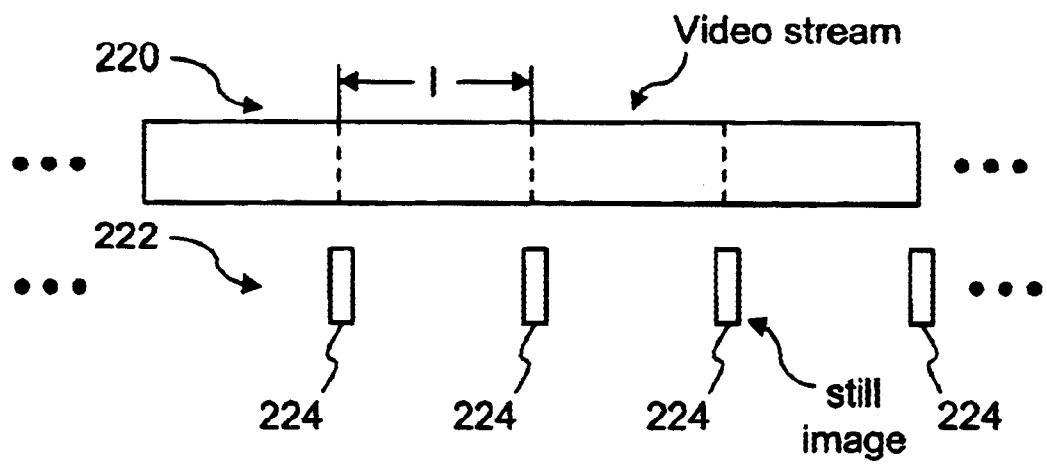
FIG. 2B is a diagram illustrating the relationship between a video stream and a series of still images.

FIG. 2B is a diagram illustrating the relationship between a video stream 220 and a still image series 222. The video stream 220 is typically an ongoing stream of video data that is constantly acquired in accordance with a particular frame rate. Periodically, at the occurrence rate associated with an interlace interval (I), still images 224 are acquired and stored. The still images 224 so acquired form the still image series 222. Note that in FIG. 2B the video stream 220 is separate from the still image series 222. By keeping these different types of images separate, their storage can be on different storage media and thus can be subsequently analyzed using different equipment or techniques. For example, with respect to FIG. 1, the video stream 220 can be stored to the storage device 112, and the still image series 222 can be stored to the removable storage medium 114. Even though the video stream 220 is separate from the still image series 222, the images can be correlated such that a particular still image is linked to the particular video image that was taken at, or nearly at, the same time. The correlation can be achieved in various ways. One way is to include in the correlated video image a reference to the still image. Another way is to include a time stamp or reference either in or associated with each image.

Figure 2C:
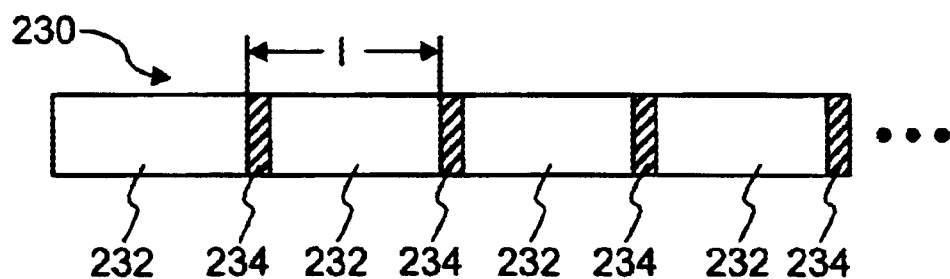
FIG. 2C is a diagram of an image stream according to another embodiment of the invention.

FIG. 2C is a diagram of an image stream 230 according to another embodiment of the invention. The image stream 230 combines video stream portions 232 (i.e., series of video images) and still images 234 within the image stream 230. The still images 234 are embedded or integral with the video stream 230. Because the still images 234 are periodically captured and stored in accordance with the interlace interval (I), the still images 234 are interlaced in the image stream between a pair of the video stream portions 232. The image stream 230 can thus be stored on a single storage medium, such as the storage device 112 illustrated in FIG. 1. Typically, the still images 234 have a different format than do the video stream portions 232. For example, the video regions 232 typically correspond to a low quality video broadcast standard such as NTSC or PAL, while the still images are typically high resolution and/or quality and follow a graphical standard (e.g., MPEG, JPEG, TIF, GIF, etc.).

In one embodiment, the security camera system 100, namely the DPS 108 within the dual mode camera 102, operates to switch between modes in order to store the video stream portions and the still images. Namely, when in the video mode, the video stream portions are stored, and when in the still mode, the still images are stored. The DPS 108 can automatically perform such switching so that still images can intermittently be acquired and stored and so that a video stream is continuously (or nearly continuously) captured and stored.

Figure 2D:
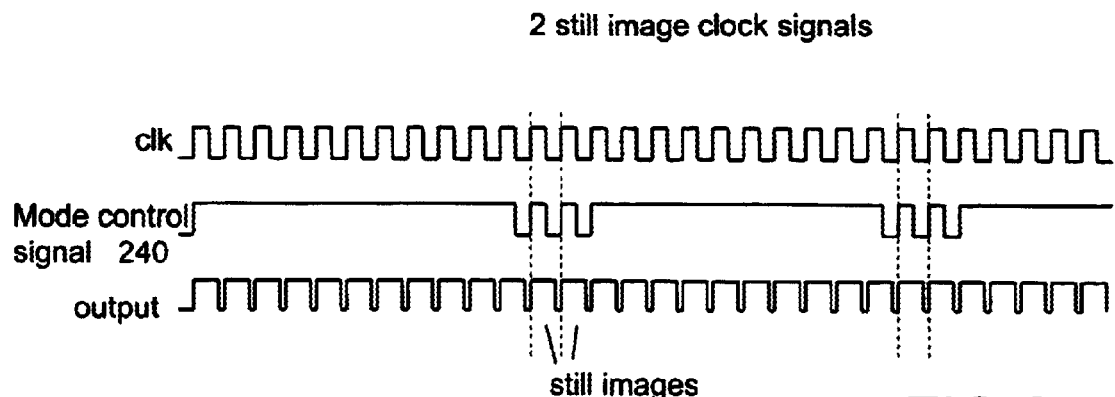
FIG. 2D illustrates a mode control signal and an image acquisition signal.

FIG. 2D illustrates a mode control signal 240 and an image acquisition signal 242. The mode control signal 240 typically causes the dual mode camera to operate in a video mode but periodically switches to an image mode for a short duration. The image acquisition signal 242 indicates that frames for a video section are sequentially acquired and stored while in the video mode, and that at every interlace interval the mode is switched to the still mode so that at least one still image can be acquired. Although storage of a single still image every interlace interval is normally desirable, more than one image could be stored every interlace interval. For example, in this embodiment as shown in FIG. 2D, two successive still images are acquired and stored each interlace interval.

Figure 2E:
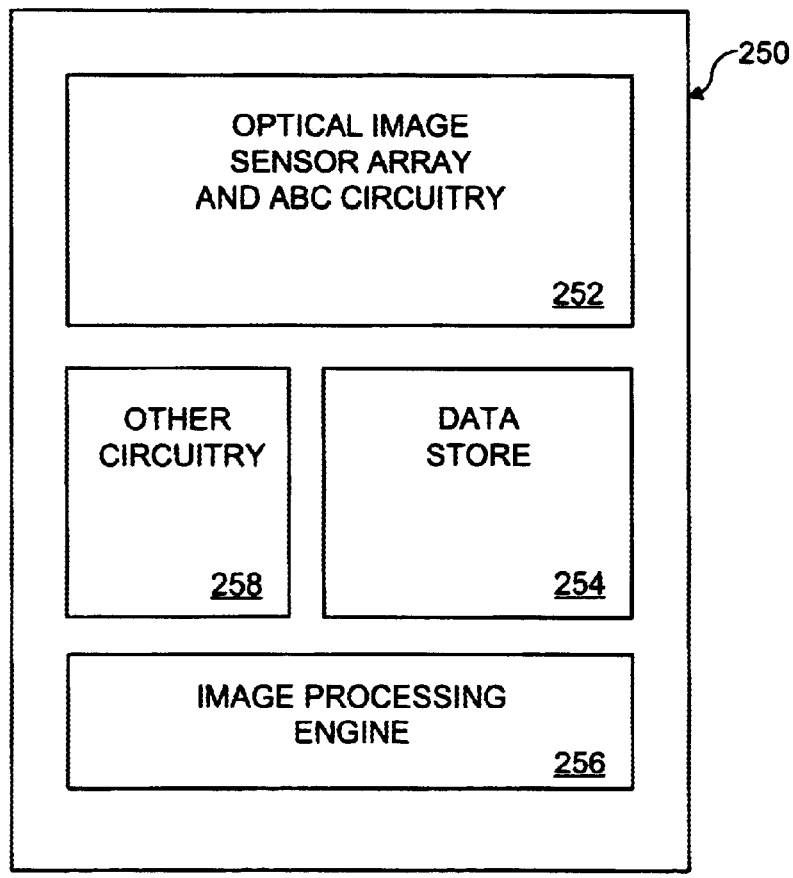
FIG. 2E illustrates a digital pixel sensor according to one embodiment of the invention.

FIG. 2E illustrates a Digital Pixel Sensor (DPS) 250 according to one embodiment of the invention. The DPS 250 is, for example, suitable for use as the DPS 108 illustrated in FIG. 1. The DPS 250 includes an optical image sensor array and Analog-to-Digital Converter (ADC) circuitry 252, a data store 254 (e.g., Random-Access Memory (RAM)), an image processing engine 256, and other circuitry 258. The DPS 250 is a single integrated circuit (i.e., single chip) that houses the Optical Image Sensor Array and ADC circuitry 252, the data store 254, the image processing engine 256, and the other circuitry 258. The other circuitry 258 can pertain to a variety of different circuitry, such as for interfacing, programming, customization, Input/Output (I/O), etc. Examples of the other circuitry 258 that can be added to the DPS 250 include: (1) a sense amplifier and latches coupled to the optical image sensor array and ADC circuitry 252 to facilitate readout of the digital signals therefrom; (2) a threshold memory for storing threshold values; and (3) a time index memory for storing time index values.

The optical image sensors of the optical image sensor array and ADC circuitry 252 operate to receive an optical image (e.g., such as through a lens) and produce analog signals representing the image. In one embodiment, the optical image sensors use CMOS technology to produce the analog signals representing the image. The ADC circuitry of the optical image sensor array and ADC circuitry 252 converts the analog signals into digital signals. In one embodiment, the ADC circuitry is integral with the image sensors so that high speed, high resolution digital images are facilitated.

In one embodiment, the optical image sensor array and ADC circuitry 252 is a digital sensor array. The optical image sensor array and ADC circuitry 252 are integrally formed on a semiconductor substrate; The substrate can be fabricated using, for example, CMOS processing techniques (also referred to as CMOS fabrication) known to those having ordinary skill in the art. CMOS fabrication allows both the digital sensor array and other circuit structures including, but not limited to, the data store 254, the image processing engine 256, and the other circuitry 258 to be formed on the same substrate.

In one embodiment, the digital sensor array features a plurality of optical imaging sensors (e.g., photodetectors) and pixel-level Analog-to-Digital Conversion (ADC) circuitry. Suitable circuitry for implementing a digital sensor array is described in U.S. Pat. No. 5,461,425 to Fowler et al., which is hereby incorporated herein by reference. Typically, the digital sensor array is provided as a two-dimensional array of image sensors, each of which have pixel-level ADC circuitry. However, to reduce the amount of pixel-level ADC circuitry, each instance of ADC circuitry can be shared by multiple image sensors. Additionally, the digital sensor array can be used in color applications. For example, red, green, and blue filters can be used to selectively filter light received by the digital pixel sensors to produce spectrum sensitive exposure images which can be integrated to form color pictures. CMYG or other types of filters may alternatively be used.

The digital signals representing the image (sensor data) are then output from the optical image sensor array and ADC circuitry 252 and stored in the data store 254. Typically, the data store 254 can store at least a frame of the sensor data. The image processing engine 256 then operates on the sensor data stored in the data store 254 (or directly from the optical sensor array and ADC circuitry 252) to produce pixel image data. For example, the sensor data can be converted to red, green and blue pixel data. The conversion from sensor data to pixel image data is generally known to those skilled in the art. Resolution and/or quality modification as well as data formats for the different modes of operation of the dual mode camera 102 can also be handled by the image processing engine 256 as discussed in more detail below. There are numerous formats that are usable and new formats are often developed. Examples of video formats include NTFS, NTSC, PAL, MPEG and AVI, and still image formats include JPEG, BMP and GIF.

The architecture of the DPS 250 shown in FIG. 2E facilitates high speed image acquisition and processing. Having the optical image sensor array integral with the ADC circuitry can essentially enable all sensor data for a frame to be available at once. In other words, the optical image sensor array and ADC circuitry 252 simultaneously capture sensor data and output digital sensor data for each pixel of a frame, and thus render the frame of sensor data almost instantly available in digital form to other components, such as the data store 254 or the image processing engine 256. As a result, the sensor data can be immediately accessed and processed by these other components.

The DPS 108, 250 and the image processing engine 256 combine to support the multiple modes of operation, namely, video mode and still mode, for the dual mode camera 102 illustrated in FIG. 1. Because the single DPS 108, 250 support the different modes of operation, the flexibility and usefulness of the dual mode camera 102 is improved. The multiple modes are also able to be provided in a cost effective manner as only a single image acquisition system is needed for all of the modes. The DPS 108, 250 also has the capability to rapidly switch between the different modes. Moreover, the invention yields reduced power consumption and supports smaller form factor products.

Figure 3A:
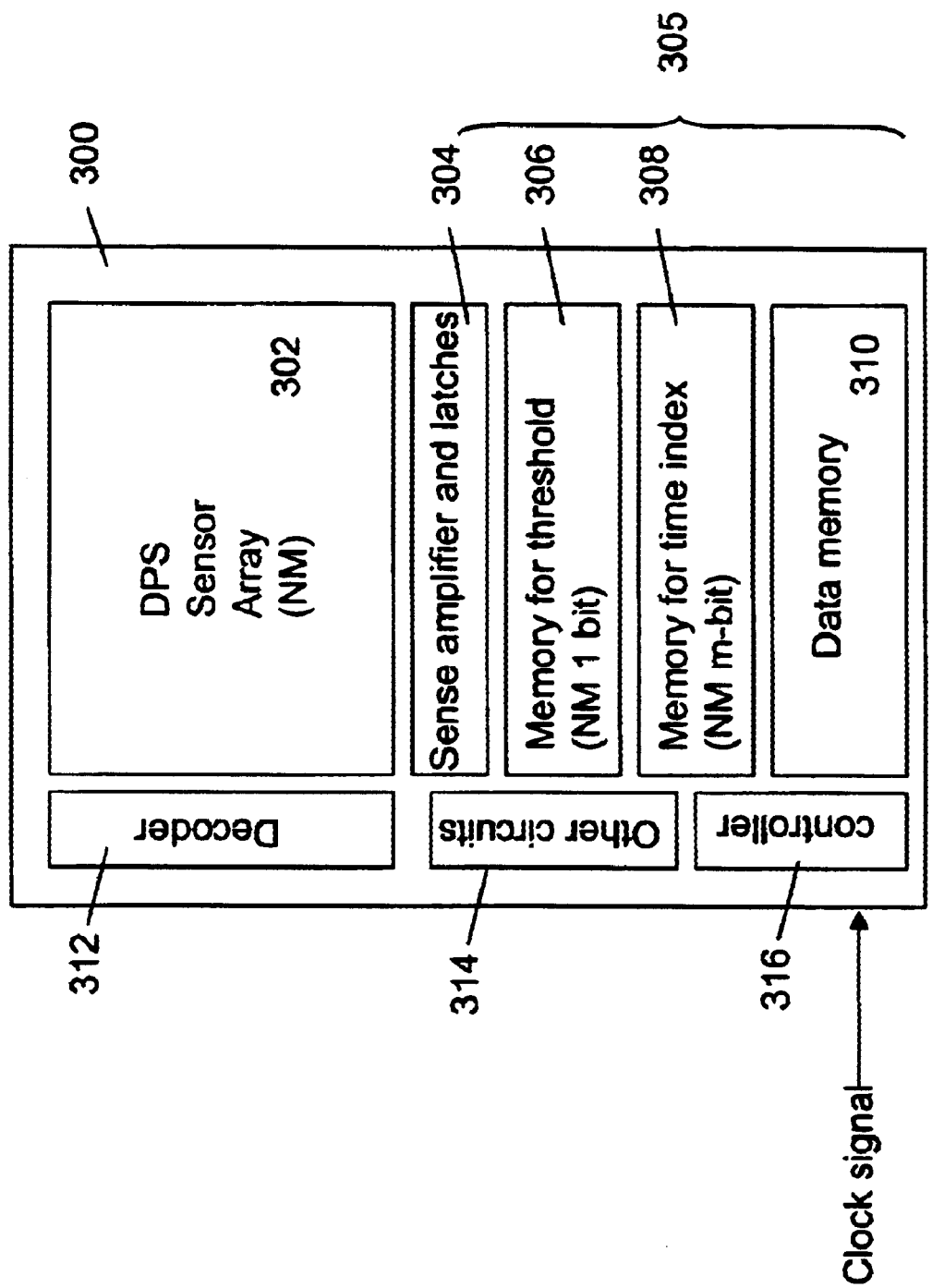
FIG. 3A illustrates a digital pixel sensor according to another embodiment of the invention.

Referring to FIG. 3A, there is shown an image sensor 300 based on a digital pixel sensor (DPS) architecture and suitable for use in the dual mode camera 102 illustrated in FIG. 1. The sensor array 302 comprising DPS elements as detailed in FIG. 3B outputs digital signals representing one or more images of a scene, which is significantly different from conventional CCD or CMOS image sensors which output analog signals.

Figure 3B:
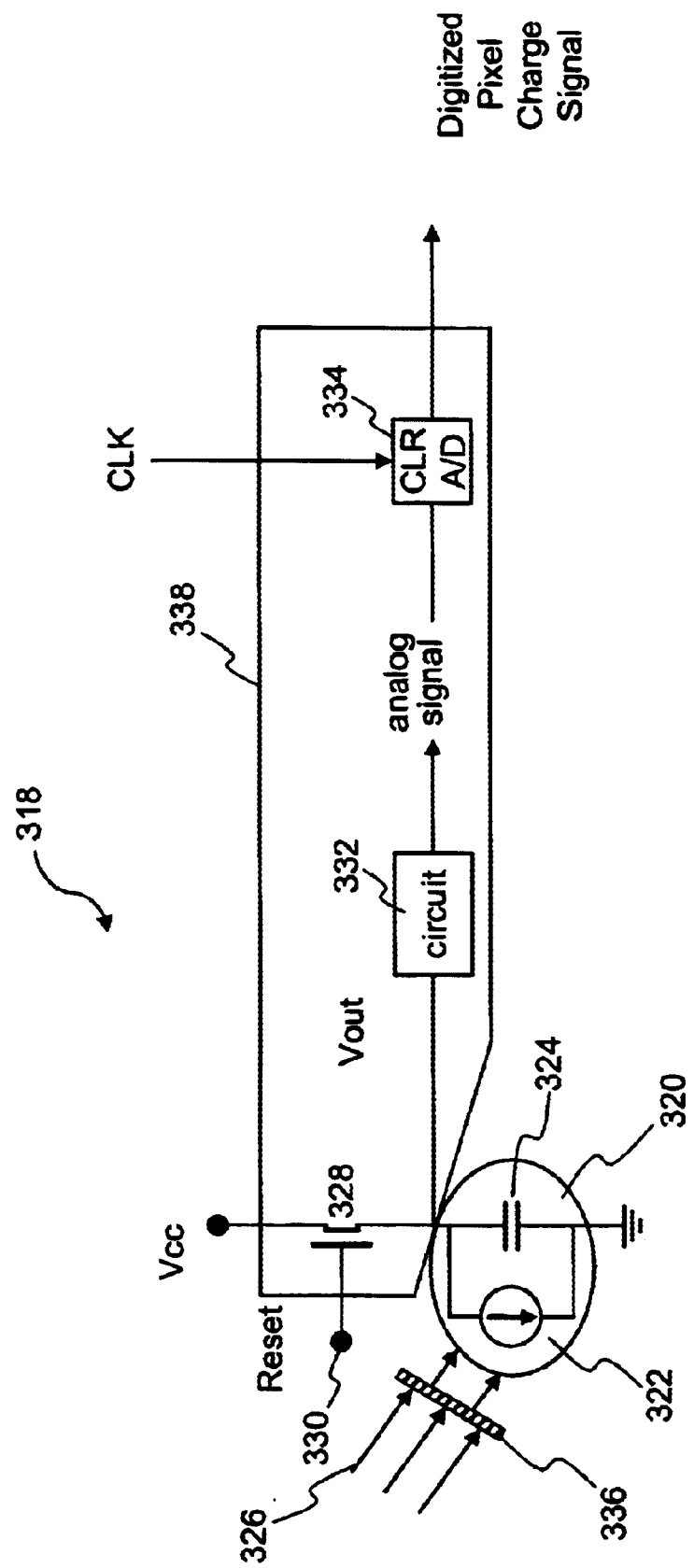
FIG. 3B illustrates a circuit diagram illustrating a digital pixel sensor element according to one embodiment.

Referring now to FIG. 3B, there is shown a circuit diagram illustrating functions of a DPS element 318 used in digital pixel sensor 302 according to one embodiment. Different from a conventional pixel element that is primarily a photosensor, the DPS element 318 includes a photosensor 320 (e.g., a photodiode) and pixel supporting circuitry 338. The photosensor 320 may be represented as a current source 322 in parallel with a capacitor 324. The photosensor 320 is coupled in series with the source or drain of transistor 328, and the combination of the photosensor 320 and the transistor 328 is coupled between a voltage $V_{cc}$ and ground. A gate 330 of the transistor 328 is coupled to receive a reset signal. When the reset signal to the gate 330 is reset (e.g., to a high), the transistor 328 is on, and thus the capacitor 324 is charged to $V_{cc}$ less the threshold voltage $V_{th}$ of the transistor 328. On the other hand, when the reset signal is set (e.g., to a low) to turn the transistor 328 off, then the capacitor 324 is discharged through the current source 322.

The current source 322 discharges the capacitor 324 at a rate dependent on the number of photons striking the photosensor 320. The photons from light 326, focused by a filter 336, are incident on the photosensor 320. The voltage across the capacitor 324 is dependent on the total number of photons that strike the photosensor 320. A voltage output signal $V_{out}$, which is the voltage across the capacitor 324, is indicative of the integrated light intensity between the time that the transistor 328 is turned off and the time that the light 326 incident on the photosensor 320 is turned off.

A circuit 332 is coupled to receive the voltage output signal $V_{out}$ from the capacitor 324. The circuit 332 enhances the voltage output signal $V_{out}$ to create a pixel charge signal (analog signal). The pixel charge signal is an enhanced voltage output signal suitable for coupling to the following analog-to-digital conversion circuitry 334. It should be noted that the circuit 332 is not necessary in some embodiments. Depending on an exact implementation, the use of the circuit 332 may sometimes increase the sensitivity of the photosensor 320.

Analog-to-digital conversion circuitry 334 is coupled to receive the pixel charge signal (i.e., an analog signal) from circuit 332 and convert the analog signal when triggered by a clock (CLK) signal to produce a digitized pixel charge signal. Examples of analog-to-digital conversion circuitry 334 may include a regular well-known A/D converter or bit-serial analog-to-digital conversion circuit disclosed in co-pending U.S. patent application Ser. No. 09/274,202, entitled "Methods for Simultaneous Analog-to-Digital Conversion and Multiplication", which is hereby incorporated by reference in its entirety. One of the advantages of digitizing the pixel charge signal within the photosensor 320 is that a digitized pixel charge signal can be read out at much higher speeds than can a corresponding analog signal from a traditional photosensor. Further, since each of the pixel elements in the DPS sensor array 302 can output digital signals concurrently and the digital signals can be read out in parallel (e.g., in a row or column fashion), the clocking signal to support the readout thus could be relatively low without compromising the readout speed. As a result, the power consumption of the DPS sensor array 302 is relatively low compared to a conventional CMOS image sensor for the same data readout speed.

It should be noted that the DPS element 318 in FIG. 3B is an exemplary implementation of a DPS element. In one embodiment, the analog-to-digital conversion circuitry 334 can be shared by a group of neighboring pixels (e.g., 4 photosensors) to reduce the actual size of an image sensor.

Referring back to FIG. 3A, sense amplifier and latches 304 are coupled to the DPS sensor array 302 to facilitate the readout of the digital signals. In addition, the image sensor 300 also includes a memory 305 that is virtually partitioned as a memory 306 (referred to herein as threshold memory) for storing threshold values, a memory 308 (referred to herein as time index memory) for storing time index values, and a digital or data memory 310 that is large enough to accommodate a frame of image data from the DPS sensor array 302. The detailed description of operations of the memories 306, 308 and 310 is provided in U.S. application Ser. No. 09/567,786, which is hereby incorporated herein by reference. As a result of the above memory configuration, each of the pixel elements in the DPS sensor array 302 can respectively correspond to specific, associated memory cells in the threshold memory 306, the time index memory 308, and the data memory 310.

In operation, at each of the time indices, for example, T, 2T, 4T and 8T, the DPS sensor array 302 is read out (e.g., four times), resulting in four images at four different exposure times. In other words, a scene being acquired by the image sensor 300 is sampled multiple times by the DPS sensor array 302 given a predefined exposure time. FIG. 3C shows an example of the multiple exposures. As shown in FIG. 3C, frame 1 is created after time T, frame 2 is created after time 2T, frame 3 is created after time 4T, and frame 4 is created after time 8T. One of the advantages of having multiple images of the same target within an exposure time is the ability to expand the dynamic range of the image captured as pixel values in each of the frames. Such values can be selectively read into data memory 310 in accordance with threshold memory 308. Because of the relative short exposure time, frame 1 typically captures information that is related to high illumination areas in the target. Likewise, because of the relatively long exposure time, frame 4 typically captures information that is related to low illumination areas in the target. Frame 2 and frame 3 thus capture information that is related to gradually increased illumination areas in the target. As a result, the combination of the multiple images with respect to the time index memory provides a very wide dynamic range.

In operation, a snapshot of a scene to be read out multiple times at different times prevent the photodetectors in the sensor array from being saturated. When a value in the threshold memory detects that a corresponding photodetector is saturated, the value from the corresponding photodetector in subsequent frames will be prevented from writing into the data memory 310. The feature is very helpful in cases where images are being acquired under dynamically changed lighting conditions.

The memory 305 or the data memory 310 is essentially a RAM and can be randomly accessed for different purposes.

One of the purposes is to read the data out in different resolutions to accommodate different applications (preferably without compromising the image quality). According to one embodiment, the way image data in the data memory 310 is read out is controlled by a set of parameters that may be embedded in a controller 316 (e.g., image processing controller) or other circuits 314. For example, when in the video mode, a first set of parameters is active and causes the data to be read out in a decimating fashion, namely the spatial resolution is reduced. Alternatively, when in the still mode, a second set of parameters is active and causes the data to be read out with high spatial resolution. In other words, the controller 316 can oversee the reading of the data from the data memory 310 such that the resolution and format are suitable for video transmissions when in the video mode or for still images when in the still mode. Additionally, the parameters, regardless of mode, can also cause the data to be extracted from one or more bit planes of data, so as to control intensity of the images. The detailed operation of the bit plane data readout is provided in U.S. patent application Ser. No. 09/638,502, entitled "Implementation of Pixel Normalization in a Digital Pixel Sensor", which is incorporated herein by reference.

Figure 3D:
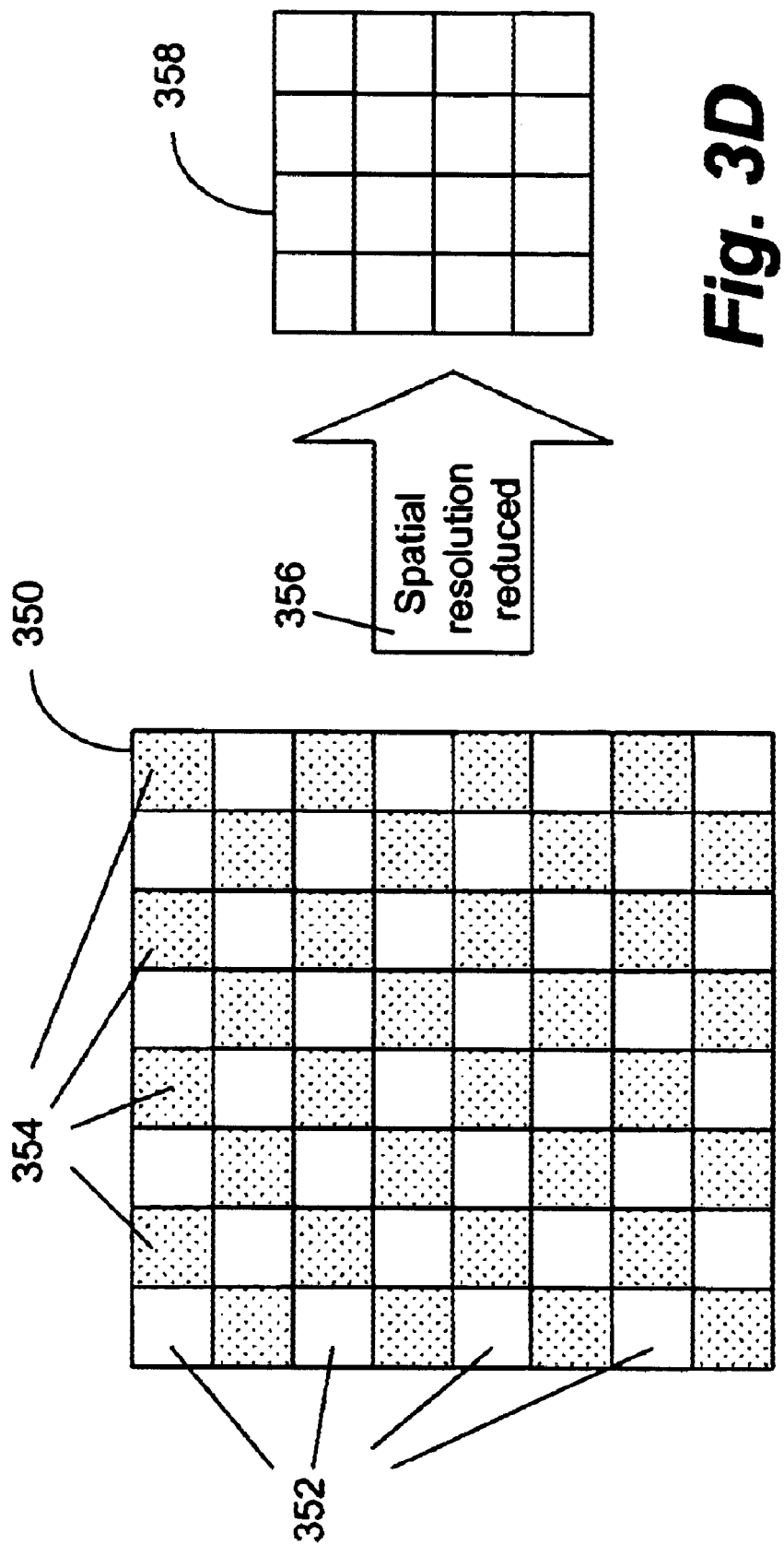
FIG. 3D illustrates a spatial resolution reduction process according to one embodiment.

According to one embodiment of the present invention, FIG. 3D illustrates a spatial resolution reduction process. Pixel data structure 350 is representative of a part of data memory 310. Each of the blocks 352 and 354 in the data structure 350 represent one pixel value produced from the pixel element in DPS sensor array 302. The pixel value may be in 8-bit or more precision. As an example, for a scene image, the controller 316 or other circuitry can control the readout of the image data from the data memory 310 such that only the pixel values in every other block are read out so as to perform a spatial resolution reduction 356 by a factor of 2. As a result, an image 358 readout from the data memory 310 is suitable as a scene image.

Likewise, FIG. 3E shows a set of bit planes representing a part of the data memory 310. Each of the planes 372 (i.e., 372-1 to 372-n) represent a bit plane in an image. For example, if the image is 8-bit precision, there can be 8 planes, hence plane 372-1 is a most significant bit (MSB) plane and plane 372-8 is a least significant bit (LSB) plane. For document images, the controller 316 or other circuitry can control the readout of the image data from the data memory 310 to perform intensity resolution reduction 376 such that, for example, only the MSB plane 372-1 is read out to represent a binary image 374. The readout can be performed in other ways to generate images with less or different intensity resolutions. Alternatively, the controller 316 or other circuits 314 could modify the image processing algorithms used to convert sensor data into image data according to whether higher still image quality or lower video image quality is desired in a given frame. In this way, the readout of the image data can have different quality depending upon different hardware or software or a combination as implemented on the image sensor 300.

Given the description, the implementation of such a readout mechanism is evident to those skilled in the art. The implementation can be in hardware, software or a combination of both. The details of various implementations are not to be described herein to avoid obscuring the scope of current invention.

The image acquisition system according to the invention is usable in various applications. The image acquisition system is particularly useful for security applications that make use of cameras. The ability of the image acquisition system to yield images of high dynamic range and quality, enables the images, particularly still images, to be produced in light or dark conditions (e.g., daytime or nighttime).

The invention is preferably implemented in a combination of hardware and software. The software portion can be embodied as computer readable code on a computer readable medium. The computer readable medium is any data storage device that can store data which can thereafter be read by a computer system or electrical circuitry. Examples of the computer readable medium include read-only memory (ROM), random-access memory (RAM), CD-ROMs, magnetic tape, optical data storage devices, carrier waves, and magnetic disk drives. The computer readable medium can also be distributed over network coupled computer systems so that the computer readable code is stored and executed in a distributed fashion.

The advantages of the invention are numerous. Different embodiments or implementations may yield one or more of the following advantages. One advantage of the invention is that additional detail and information beyond standard video streams can be acquired by an image acquisition system without requiring massive amounts of data storage. Another advantage of the invention is that image acquisition systems can be produced to support smaller form factor products. Still another advantage of the invention is that image acquisition systems can support both video images and still images in a cost effective manner. Yet another advantage of the invention is that image acquisition systems can automatically switch between different modes to capture and store different types of images (e.g., video images and still images) that have different resolutions, qualities and/or formats.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for operating an electronic image capturing system having a single image sensor array, said method comprising:

capturing a first series of video images and storing data of the first series of video images in a first resolution in a data memory of the image sensor array, wherein the data of the first series of video images is read out in accordance with a second resolution;

capturing a first still image and storing data of the first still image in the first resolution in the data memory of the image sensor, wherein the data of the first still image is read out in accordance with the first resolution;

capturing a second series of video images and storing data of the second series of video images in the first resolution in the data memory of the image sensor array, wherein the data of the second series of video images is read out in accordance with the second resolution;

capturing a second still image and storing data of the second still image in the first resolution in the data memory of the image sensor, wherein the data of the second still image is read out in accordance with the first resolution, and wherein the single image sensor array is a digital image sensor including an on-chip memory partitioned as at least the data memory and an index memory, and directly producing video images or still images in digital form, each of the video images or still images composed from multiple frames representing sequentially increased exposures to a scene within a predetermined exposure time in accordance with time index values in the index memory.

2. A method as recited in claim 1, wherein the electronic image capturing system includes at least a first data storage device associated therewith, and wherein the data of the first and second series of video images are stored in the first data storage device.

3. A method as recited in claim 2, wherein the electronic image capturing system further includes at least a second data storage device associated therewith, and wherein the data of the first and second still images are stored in the second data storage device.

4. A method as recited in claim 3, wherein the first data storage device is a magnetic disk drive or tape storage device.

5. A method as recited in claim 4, wherein the second data storage device is a portable semiconductor storage device.

6. A method as recited in claim 4, wherein the second data storage device is a portable magnetic storage device.

7. A method as recited in claim 1, wherein the electronic image capturing system includes at least a data storage device associated therewith, wherein the data of the first and second series of video images are stored in the data storage device, and wherein the data of the first and second still images are stored in the data storage device.

8. A method as recited in claim 7, wherein as stored in the data storage device, the data of the first series of video images, the first still image, the second series of video images and the second still image are contiguously stored in the data storage device with one of the first and second still images interlaced between the first and second series of video images.

9. A method as recited in claim 8, wherein the data storage device is a magnetic tape storage device.

10. A method as recited in claim 1, wherein the electronic image capturing system is a camera.

11. A method as recited in claim 1, wherein the electronic image capturing system is provided within a camera.

12. A method as recited in claim 11, wherein the camera is used in a security environment to monitor the scene, wherein the data of the first and second still images are periodically stored to provide high resolution and/or high quality still images of the scene, and wherein the second resolution and quality of the first and second series of video images being stored are low or moderate resolution and/or quality video representations of the scene.

13. A method for operating an electronic image capturing system having a single image sensor array, said method comprising:

(a) operating the electronic image capturing system in a first mode so that data of video images in a data memory of the single image sensor array is read out in a first resolution;

(b) periodically switching the electronic image capturing system to a second mode;

(c) operating the electronic image capturing system in the second mode so that data of a still image in the data memory of the single image sensor array is read out in a second resolution;

(d) thereafter switching the electronic image capturing system back to the first mode; and wherein the single image sensor array is a digital image sensor including an on-chip memory partitioned as at least the data memory and an index memory, and directly producing video images or still images in digital form, each of the video images or still images composed from multiple frames representing sequentially increased exposures to a scene within a predetermined exposure time in accordance with time index values in the index memory.

14. A method as recited in claim 13, wherein said method further comprises:

(e) repeating said operating (a) through said switching (d).

15. A method as recited in claim 13, wherein said method causes the electronic image capturing system to mainly be in the first mode and only periodically and temporarily be in the second mode.

16. A method as recited in claim 13, wherein the electronic image capturing system is provided within a camera.

17. A single-chip image acquisition system having a video mode and a still mode, comprising:

a digital sensor array having a plurality of pixel sensors, each of the pixel sensors configured to generate an analog signal and convert the analog signal to a digital signal, digital signals from the pixel sensors forming sensor digital image information; and an image processor operatively connected to said digital sensor array, said image processor operating to produce video images in a first resolution from a data memory of said digital sensor array when in the video mode, and operating to produce still images in a second resolution from the data memory of said digital sensor array when in the still mode, wherein said digital sensor array and said image processor are provided on a single integrated circuit chip and said digital sensor array includes an on-chip memory partitioned as at least the data memory and an index memory, each of the video images or still images composed from multiple frames representing sequentially increased exposures to the scene within a predetermined exposure time in accordance with time index values in the index memory.

18. A single-chip image acquisition system as recited in claim 17, wherein the still images have greater resolution and/or quality than video images.

19. A single-chip image acquisition system as recited in claim 17, wherein said image processor produces the video images in a first format and produces the still images in a second format.

20. A single-chip image acquisition system as recited in claim 17, wherein said image processor performs at least one of resolution quality and intensity reduction in producing the video images.

21. A single-chip image acquisition system as recited in claim 17, wherein said single-chip image acquisition system further comprises:

a memory operatively connected to said digital sensor array and said image processor, said memory stores at least said sensor digital image information, and wherein said digital sensor array, said image processor, and said memory are all provided on a single integrated circuit chip.

22. A single-chip image acquisition system as recited in claim 17, wherein said single-chip image acquisition system is provided within a camera.

* * * * *